Patented Jan. 21, 1947

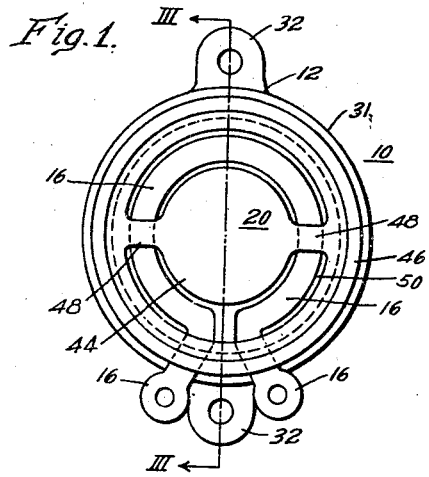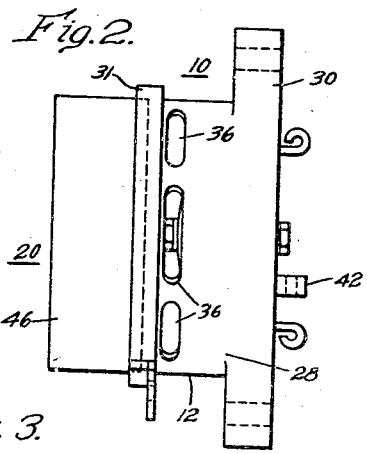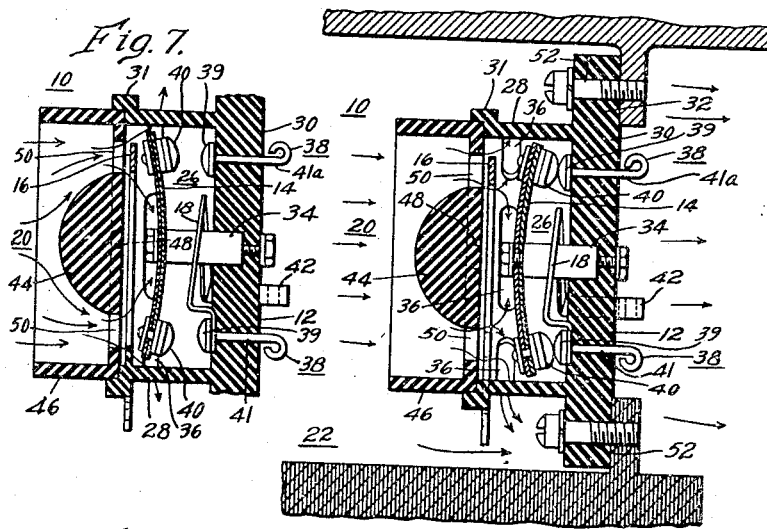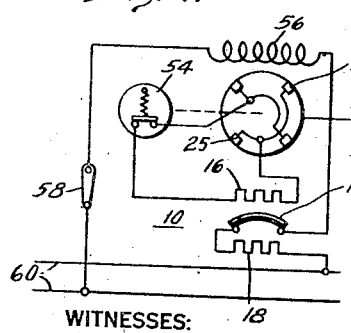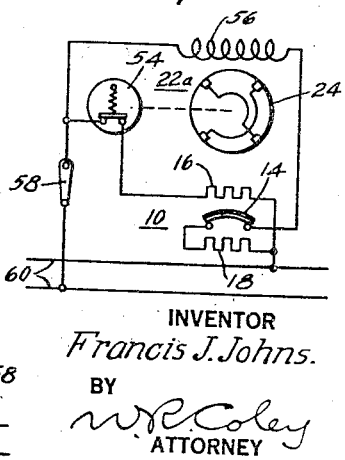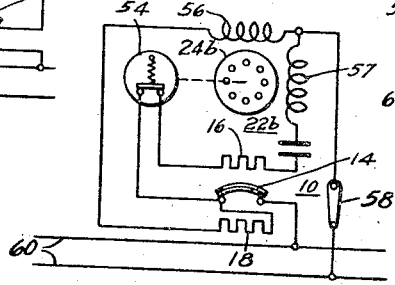

2,414,531

UNITED STATES PATENT OFFICE 2,414,531

MULTIPLE HEATER THERMAL SWITCH

Francis J. Johns, Pittsburgh, Pa., assignor to Westinghouse Electric Corporation, East Pittsburgh, Pa., a corporation of Pennsylvania Original application May 31, 1940, Serial No. 338,123, now Patent No. 2,338,515, January 4, 1944. Divided and this application April 20, 1943, Serial No. 483,742

8 Claims. (Cl. 200—122)

My invention relates to thermal protection for rotating electrical equipment and, more particularly, to the thermal protection of single phase alternating current motors.

This application is a division of my copending application Serial No. 338,123, filed May 31, 1940, Patent No. 2,338,515, issued January 4, 1944, and assigned to Westinghouse Electric & Manufacturing Company.

The use of thermostats in the primary circuit of a motor, or the like, as thermal protection for the motor is well known. However, such thermostats cannot disengage the motor from a power supply under stalled rotor conditions within the safe time limits of the rotor, say 3 to 4 seconds, without impairing the operation of such thermostat and motor during the normal operation thereof. In other words, a protective thermostat located in the primary circuit cannot, of itself, adequately protect the rotor under abnormally heavy or stalled conditions.

In addition, the use of a thermal protective device positioned within the rotor so as to be responsive to the heat thereof is well known. However, in all such cases the device cannot be made to operate within the safe limits of the rotor and at the same time permit the rotor to accelerate under severe accelerating conditions. In other words, such thermal protective devices heretofore positioned within the rotor have had to be adjusted to permit such rotor to accelerate under heavy load conditions regardless of the protection afforded under locked rotor conditions. In all cases the protective devices have thus had to be set at an arbitrary value without due regard to the complete thermal protection of the motor.

To overcome these serious disadvantages and to adequately protect the motor under all conditions, I propose to incorporate a thermal protective device with the rotor, which is inversely responsive to the speed of such rotor. Such a device equally protects the rotor under both stalled and heavy or abnormal accelerating conditions.

One object of my invention is to provide a thermal switch capable of being mounted within the air passage of a motor having a heater for operating such switch electrically associated with the rotor for supplying heat to the switch inversely in response to the speed of the rotor and adapted to be cooled by air directly in response to the rotating speed of the rotor.

Another object of my invention is to provide a thermal switch having a thermally responsive member, and a heater thermally associated therewith, with a baffle positioned adjacent the heater to direct the passage of air thereabouts to cool the heater in direct response to the passage of such air.

Other objects of my invention will either be pointed out specifically in the course of the following description of a device embodying my invention, or will be apparent from such description.

In the accompanying drawing:

Figures 1 and 2 are front and side views, respectively, of a thermostatic switch embodying my invention;

Fig. 3 is a sectional view taken along the line III—III of Fig. 1 illustrating the device mounted within an air passage of an electric motor or the like;

Fig. 4 is a schematic wiring diagram illustrating the connections of the thermostatic switch as associated with the motor illustrated in Fig. 3;

Figs. 5 and 6 are schematic wiring diagrams illustrating modified wiring connections of the device embodying my invention; and Fig. 7 is a sectional view of the device similar to Fig. 3 but showing the device in its operated position.

Referring to the accompanying drawing, in which like reference characters indicate like parts in the several figures, I show a thermally responsive switch or thermostat 10, rigidly attached to a motor 22 and positioned within an air passage thereof, comprising a housing or casing 12, a bimetallic thermally-responsive member 14, two heating elements 16 and 18 and an air baffle structure 20. The heating element 16 is electrically associated with the rotor 24 of the motor 22, and the heating element 18 is connected in the primary circuit thereof. The elements 16 and 18 are located one on either side of the bimetallic member 14 with the air baffle structure 20 associated therewith.

The housing or casing 12 is, in this instance, a circular cup-shaped structure, which is formed of a suitable phenolic resin. However, it is to be understood that such structure may be formed from any other suitable insulating material. The cup-shaped housing or casing 12 has a centrally located apparatus-receiving space 26, a base portion 30, a cylindrical or sleeve-like portion 28 and a peripheral internally shouldered flange 31. The base 30 and cylindrical portions 31 and 28, respectively, are, in this instance, formed as an integral member. Suitable ear or flanged portions 32 are integrally formed with the base 30 substantially diametrically opposite to each other to afford means for rigidly attaching the thermostat 10 to the motor 22, as hereinafter described.

The bimetallic disc 14 is, in this instance, a disc of a well-known type which is rigidly attached to the base 30 of housing 12 by means of a suitable upstanding post 34. The bimetallic member 14 is rigidly attached to the base 30 by means of such post so as to flex from the concave or operative position (see Fig. 3) to a convex or inoperative position (see Fig. 7) in a well-known manner. Bimetallic member 14 is positioned within the hollow portion 26 of the supporting structure 12 substantially coaxially therewith so as to operate wholly within such hollow portion, as hereinafter described. A plurality of movable contacts 40 are rigidly attached to such member 14 so as to cooperate with suitable stationary contact members 38.

Suitable elongated or slot-like apertures 36 (see Figs. 2 and 3) are located within the upstanding cylindrical portion 28 of the housing or supporting structure 12 to permit the passage of air therethrough as hereinafter described. Such apertures are positioned substantially in line with the bimetallic member 14 or intermediate such member and the heating element 16 to permit the air passing over and about such element to pass therethrough, as hereinafter described.

The terminal and stationary contact members 38 are positioned upon and pass through the base portion 30 of casing 12 to cooperate with the contacts 40 rigidly attached to the bimetallic member 14. The contact structures 38 comprise a button-like contact member 39 located within the hollow portion 26 and elongated terminal portions 41 and 41a which pass through the base portion 30 of housing 12. The contact members 38 in cooperation with member 14 thus provide means for conducting electric power through the thermostat 10.

The heating element 16 is mounted on the outer section of the hollow portion 28 of casing 12 and is positioned in such a manner that the bimetallic member 14 may flex from an operative to an inoperative position without contacting such heater. Such heating element 16 may be formed of any suitable electrical resistance material having any desired cross-sectional configuration. However, it is preferred that such element be formed of ordinary circular wire for low current usages and of ribbon-like material for high current usages. The heater 16 is, in this instance, a flat circular ribbon-like member, the ends of which pass outwardly through the upstanding portion 28 of casing 12 to afford means for making connection with such heater.

The ribbon-like heater 16 is looped into substantially an annulus, and is positioned substantially coaxially and parallel with the bimetallic member 14 so as to be in normal thermal communication therewith.

The heating element 18 is an elongated resistance member which is disposed around the upstanding post 34 intermediate the bimetallic member 14 and base 30 in a well-known manner. One end of the heater 18 is rigidly attached to one of the stationary contact members 38, while the other end of such heater 18 passes through base 30 and functions as a terminal 42 for the switch structure 10. The heating element 18, like element 16, is in thermal communication with the bimetallic member 14, whereby such elements are adapted to control the movements of the bimetallic member 14 in response to the passage of current through the elements as hereinafter described.

The two heating elements 16 and 18 are adapted to act independently upon the bimetallic member 14. The element 16 is preferably associated with the rotor of a motor and is adapted to receive the current flowing therethrough, while the element 18 is connected in the circuit with the main winding of the motor in a well-known manner.

The substantially cup-shaped air baffle structure or cover 20, preferably formed of insulating material, comprises a centrally located, preferably integral, knob-like or semi-spherically shaped baffling portion 44 and an exteriorly located sleeve-like portion 46, and is adapted to fit against the internally shouldered outer end of the cylindrical portion 28 of structure 12 and be secured therein in any suitable manner. The semi-spherically shaped baffle portion 44 is preferably formed with and rigidly attached to the sleeve portion 46 by means of suitably extending members or arms 48, so as to be positioned substantially in the center of the structure. The portion 44 is thus substantially coaxial with the element 16 and bimetallic disc 14. Semi-circular or arcuate apertures are thus formed about the portion 44 to permit the passage of air therethrough. Such baffling portion 44 is thus adapted to direct the passage of air passing through the thermostat 10, as hereinafter described. The members or arms 48 are as small as practically possible to adequately support the knob-like semi-spherically shaped baffling portion 44 so as to not seriously impede the travel of air through the thermostatic structure, as hereinafter described.

The air baffle structure 20 is thus adapted to direct or limit the passage of air through the thermostat so that substantially all of such air will engage the flat ribbon-like radiant element 16. Such air, after engaging the element 16, passes out through the apertures 36 in the side wall 28 of the thermostat housing 12. However, the air passing through the thermostatic switch 10, due to the presence of baffle portion 44 and of radiant element 16, does not encounter the bimetallic member 14 so as to seriously alter the operations thereof, as hereinafter described.

The thermostatic switch 10 is rigidly attached to the motor 22, a portion of which is merely shown herein, by means of suitable bolts 52 which pass through the protruding or flange portions 32 of casing 12. The thermostat 10 is positioned within an air passage of the motor 22, preferably between the frame and stator portions thereof. However, such thermostat may be mounted upon the motor in any other desired position so as to be in the path of air passing therethrough. A portion of the air passing through the motor is thus adapted to pass through the thermostat. As indicated by the arrows, this air enters the thermostat through the semi-circular slots 50 in the base of sleeve 46, passes about the radiant element 16, and out the plurality of slots 36 in the sleeve portion 28 of base 12. The presence of baffle structure 20 and radiant element 16 prevents a large portion of such air from engaging the bimetallic member 14. However, the passage of air through the thermostat always tends to counteract, to a greater or lesser degree, the heating effect of heating element 16 on the bimetallic member 14 and retard its action, as hereinafter described.

The thermostatic or thermally-responsive switch 10 is electrically associated with the motor 22, as well as being mechanically attached thereto, in a manner as illustrated in the schematic wiring diagram of Fig. 4. The motor 22 constitutes, in this instance, a so-called repulsion induction motor or, in other words, a single-phase motor having a main field winding 56 and a wound rotor 24 with a commutator thereon and short-circuiting brushes 25 operatively associated with a suitable centrifugal device 54 which is adapted to raise the brushes 25 when the rotor 24 attains a predetermined operative speed, in a well-known manner.

The flat ribbon-like heating element 16 is connected in series with the rotor 24 and the centrifugal starting device 54 so as to permit the rotor current to pass therethrough. The heating element 18 is connected in series with the bimetallic member 14 and the primary winding 56 of the motor 22, in a well-known manner. The bimetallic member 14 being in thermal communication with such elements 16 and 18 receives heat therefrom in direct response to the current passing through the rotor 24 and the primary winding 56. Should the total heat delivered to the bimetallic member 14 be above a predetermined value, such member will flex to an open position, Fig. 7, disengaging the cooperating contacts 39 and 40, so as to disconnect the main winding 56 from the power supply 60.

Assuming the motor 22 is initially disconnected from the power supply and is then connected to such power supply by means of a suitable switch 58, the rotor 24 will start to rotate with the brushes 25 in a lower or engaging position in a well-known manner. The current passing through the rotor 24 will then pass through the heater 16. However, such current will decrease in value with the increase in rotative speed of the rotor 24. Therefore, assuming that there is a normal load on such motor, the rotor will gradually increase to a predetermined rotative speed, at which time the centrifugal mechanism 54 will raise the brushes 25 and disconnect the heater 16 from such rotor. The motor will then run as a regular single-phase, squirrel-cage motor, in a well-known manner.

The current flowing through the rotor and heating element is thus responsive to the rotative speed thereof, being a maximum at the time of starting and a minimum just prior to the action of the centrifugal mechanism 54. In other words, the heat produced by heating element 16 varies inversely with the rotative speed of the rotor.

As the rotor 24 increases in speed, the quantity and velocity of air passing between the stator laminations and the frame of the motor 22 (see arrows in Fig. 3) increases. A portion of this air is directed through the thermostat 10 by means of the baffling structure 20. This, in turn, increasingly cools the element 16 in direct ratio to the increase in rotative speed of the rotor 24.

It, therefore, follows that, as the rotor 24 increases in speed, the heating effect of element 16 upon bimetallic member 14 decreases because of two reasons, namely, the decrease in current passing through the rotor 24 and the increasing quantity of cooling air passing through the baffle 20 and about such heater. Therefore, as the rotor-speed increases, the action of this cooling air supplements the action of the heating element 16 with respect to its effect on bimetallic element 14, as each of these actions tends to keep down the actual heating of the bimetallic element.

However, should there be an abnormally heavy load associated with the rotor 24 which prevents the rotation thereof as the motor 22 is connected to the power supply, the current flowing through such rotor will be proportionately abnormally large. The heat produced by element 16 will thus, likewise, be abnormally large. Accordingly, bimetallic member 14, being in thermal communication with the heater 16, will flex to its open position in response to such heat within a period of say three to four seconds. The motor 22 will, therefore, be disconnected from the power supply so as to adequately protect such rotor and its associated commutator as a result of this "stalled" or "locked-rotor" condition of the motor.

Assuming that the load associated with the rotor 24 is above a predetermined safe value but is of such value as to permit the rotor 24 to rotate at a low speed, the current passing through the rotor 24 and heater 16 will accordingly decrease from an initial relatively high value at a relatively slow rate. The heat produced by such heater 16 being directly responsive to the value of current flowing therethrough will, therefore, increase in value at a relatively rapid rate. However, the heat produced by such heater will not directly act upon the bimetallic member 14 as quickly as with the shorted or locked rotor condition hereinabove described, inasmuch as there will be a passage of cooling air through the motor in direct ratio to the rotative speed of such rotor which passes through the baffle 20 about the heater 16, cooling the heater in direct proportion to such speed. It, therefore, follows that with the abnormal heavy load and slow speed mentioned, the heater 16 will heat at a relatively rapid rate and will be cooled much slower than it will when operating in a normal manner. The bimetallic member 14 will thus operate in from, say, 6 to 8 seconds, depending upon the rotative speed and acceleration of such rotor.

It follows, therefore, that with the heater 16 being electrically associated with the rotor 24 so as to receive current therefrom inversely in magnitude with respect to the rotation of such rotor, and with such heater 16 being adapted to be contacted by air passing through the motor in direct proportion to the rotative speed of such rotor, the combined reaction of these two factors tends to vary the effective heating characteristics of such heater 16, which variation, in turn, is thermally conducted to the bimetallic member 14 so as to operate such member in response to the varying starting conditions of the motor.

If it be desired, the thermostat 10 may be associated with a motor 22a in a modified manner (see schematic wiring diagram of Fig. 5). The motor 22a illustrated in Fig. 5 is substantially the same as motor 22 illustrated in Fig. 4 and hereinabove described. However, the heating element 16 is, in this instance, directly connected to the power supply 60 through the centrifugal mechanism 54 rather than in series with the rotor 24. The operation of the rotor 24 and the protective device 10 is substantially as hereinabove described and as follows.

When there is a "locked rotor" condition, the centrifugal mechanism 54 permits the heating element 16 to remain connected to the power supply while the rotor remains stationary. Accordingly, the heat produced by heating element 16 directly acts upon the bimetallic member 14. This heat, which is not being conducted away by the passage of air through the thermostat, in conjunction with that supplied by the heating element 18, causes the bimetallic member 14 to quickly disengage the motor from the power supply within, say, 3 to 4 seconds.

Further, when there is an abnormally heavy load associated with the motor which permits the rotor to rotate only at a speed below a normal value, the element 16 is again directly connected to the power supply. However, the air circulated through the motor, due to the movement of the rotor, varies in quantity directly with the speed thereof. Accordingly, if such speed is below a predetermined value, the heat supplied by the element 16 to bimetallic member 14 will cause such bimetallic member to disengage the motor from the power supply within a safe time limit, say up to 8 to 10 seconds, depending upon the rotative speed of rotor 24.

Further, if the load applied to motor 22 be of a normal or safe value, the acceleration of rotor 24 will cause the speed to increase to such a value as to produce a larger quantity of air, so as to cool or convey the heat developed by heating element 16 away from the element at such a rate as to prevent the bimetallic member 14 from increasing in temperature above the predetermined operating value thereof. Then as the rotative speed of the rotor reaches a predetermined set value, the centrifugal mechanism will operate so as to disengage the starting brushes associated with the rotor and to disconnect the heating element 16 from the power supply. The motor will then operate in a manner well known, with the heating element 18 directly in series with the primary winding functioning by itself for a well-known thermal protective purpose.

If it be desired, the thermal protective device 10 may be operatively associated with, say a split-phase or squirrel-cage motor functioning as a capacitor motor 22b, or the like, (see the schematic diagram of Fig. 6). In this instance, the heating element 16 is connected directly in series with the starting coil 57 of motor 22b. Such thermal protective device functions substantially as hereinabove described, namely through the cooperation of the current passing through the starting winding 57 and the quantity of air passing through the motor. In this instance, under locked load conditions, the current passing through the starting winding 57, element 16 and centrifugal mechanism 54 will be abnormally large and at the same time there will be no air passing through the motor. Accordingly, the bimetallic member 14 will be actuated by means of the heat produced within the heating elements 16 and 18 within substantially 3 to 4 seconds.

However, should the rotor 24b have a relatively low rotative velocity, the air produced thereby will tend to cool the heater 16, this cooling rate being directly responsive to the rotative speed of the rotor. It follows that when such rotor does not accelerate to a predetermined speed, the bimetallic member will be sufficiently heated to be actuated and disengage the motor 22b from the power supply. However, should the motor accelerate to a predetermined desired speed, it follows that the velocity of air passing through the motor will be of such a value as to cool the heating element 16 at such a rate as to permit the bimetallic member 14 to remain in the closed or engaged position until the centrifugal device 54 is actuated. After the actuation of such device, the heating element 16 has no effect upon the bimetallic member 14 as hereinabove described.

Accordingly, the heating element 18 associated with the main winding will thereafter function in a well-known manner and actuate the bimetallic member when the motor becomes overheated during its running condition.

It is to be understood that the heating element 16 may be electrically associated with a motor in any other desired manner to receive current therefrom inversely with respect to the rotative speed thereof, until the rotor reaches a predetermined value of speed or until such time as the motor shall operate as a straight single-phase motor.

It is obvious that the heating element 18 associated with the bimetallic member 14 may be electrically associated with the motor in any other desired manner, and, if desired, may not be associated with the bimetallic member 14 but may be associated with a second bimetallic member located at any desired point, inasmuch as heating element 18 has no direct bearing upon the operation of the heater 16 and its cooperation with the bimetallic member 14. It will be appreciated that the bimetallic element 14 may readily be so designed as to properly operate with only heating element 16 associated therewith or with both heating elements 16 and 18 disposed adjacent thereto, as illustrated.

Various other modifications may be made in the device embodying my invention without departing from the spirit and scope thereof, and I desire, therefore, that only such limitations shall be placed thereon as are imposed by the prior art and the appended claims.

I claim as my invention:

1. A thermal switch comprising a supporting housing, a bimetallic member mounted within said housing, a cover for the housing having an opening therein to permit the passage of air therethrough, a first radiant heater for said member mounted intermediate the member and cover in the path of the air passage therethrough so as to be controlled by the amount and velocity of such air, and a second radiant heater mounted outside the path of the air passage so as to function independently from said air.

2. A thermal switch comprising a housing having openings therein to permit the passage of air therethrough, a bimetallic member, a radiant heater thermally associated with said member and positioned with respect to the openings so as to be affected by the air passing therethrough, and a second radiant heater thermally associated with said bimetallic member and positioned so as to operate substantially independently of the air passing through the openings in the housing.

3. A thermal switch comprising a supporting housing having openings therein to permit the passage of air therethrough, a bimetallic member, a plurality of radiant heaters disposed on opposite sides of said bimetallic member, and baffle means so disposed as to cause said air to affect one only of said radiant heaters before passing out of said housing.

4. A thermal switch comprising a supporting housing having a longitudinally extending and a laterally extending opening therein to permit the passage of air therethrough, a bimetallic member, and a plurality of radiant heaters therefor respectively disposed near to and remote from said openings.

5. A thermal switch comprising a supporting housing having an entrance and an exit opening for air disposed to produce a curve in air stream, a bimetallic member, and a plurality of radiant heaters therefor respectively disposed within the curve of said air stream and remote therefrom.

6. A thermal switch comprising a supporting housing having an entrance and an exit opening for air disposed to produce a curve in air stream, a bimetallic member, and a plurality of radiant heaters therefor respectively disposed on one side of said bimetallic member within the curve of said air stream and on the other side of said bimetallic member in a pocket of said housing.

7. A thermal switch comprising a supporting housing having a lateral opening near one end thereof, a bimetallic member mounted therein, a cover for that end of the housing having an opening therein to permit the passage of air therethrough, a first radiant heater for said bimetallic member disposed near said cover to be affected by the passage of said air, and a second radiant heater for said bimetallic member mounted near the end of said housing remote from said lateral opening.

8. A thermal switch comprising a supporting housing having a lateral opening near one end thereof, a bimetallic member mounted therein, a cover for that end of the housing having a central cup-shaped central baffle and an opening partially encircling the same to permit the passage of air, a first radiant heater for said bimetallic member disposed in part opposite said opening in the cover in the path of air therethrough, and a second radiant heater for said bimetallic member mounted within a pocket of said housing at the end thereof remote from said baffle.

FRANCIS J. JOHNS.